United States Patent [19]

Garoff et al.

[11] Patent Number: 5,767,215
[45] Date of Patent: Jun. 16, 1998

[54] COARSE-GRAINED POLYOLEFIN, ITS PRODUCTION METHOD AND A CATALYST USED IN THE METHOD

[75] Inventors: Thomas Garoff, Helsinki; Timo Leinonen, Hamari; Eero Iiskola, Porvoo, all of Finland

[73] Assignee: Borealis Holding A/S, Lyngby, Denmark

[21] Appl. No.: 468,624

[22] Filed: Jun. 6, 1995

Related U.S. Application Data

[63] Continuation of Ser. No. 146,090, Jan. 19, 1994, abandoned.

[30] Foreign Application Priority Data

May 9, 1991 [FI] Finland ........................ 912263

[51] Int. Cl.[6] ........................................ C08F 4/654
[52] U.S. Cl. .............. 526/348; 526/125.3; 526/125.6; 526/351; 502/107; 502/127
[58] Field of Search ........................... 526/125.3, 125.6, 526/348, 351; 502/107, 127

[56] References Cited

U.S. PATENT DOCUMENTS

| 4,442,276 | 4/1984 | Kashiwa et al. | 526/125 |
| 4,473,660 | 9/1984 | Albizzati et al. | 502/124 |
| 4,732,882 | 3/1988 | Allen et al. | 502/104 |
| 4,778,870 | 10/1988 | Kohyama et al. | 526/348.6 |
| 4,931,526 | 6/1990 | Yoshitake et al. | 526/336 |
| 4,952,649 | 8/1990 | Kioka et al. | 526/125 |
| 4,990,478 | 2/1991 | Hoppin et al. | 502/125 |
| 5,234,879 | 8/1993 | Garoff et al. | 502/107 |
| 5,360,776 | 11/1994 | Iiskola et al. | 502/111 |

FOREIGN PATENT DOCUMENTS

| 61-69815 | 4/1986 | Japan | 526/125 |

OTHER PUBLICATIONS

WPAT Accession No. 89-306590/42 (1989).

*Primary Examiner*—Mark Nagumo
*Attorney, Agent, or Firm*—Birch, Stewart, Kolasch & Birch, LLP

[57] ABSTRACT

The invention relates to a method for preparing polyolefins. In the polymerization, a procatalyst composition is being used, which has been prepared by contacting $MgCl_2$, a lower alcohol, a titanium compound and a phthalic acid ester. The polyolefin is given the adequate coarseness by using a procatalyst of the said type, which has been prepared by carrying out a transesterification between the lower alcohol and the phthalic acid ester and by selecting dioctyl phthalate (DOP) as phthalic acid ester.

19 Claims, 11 Drawing Sheets

FIG. 1  Ti concentration in the catalysts as a function of the alkyl group chain length in the donor
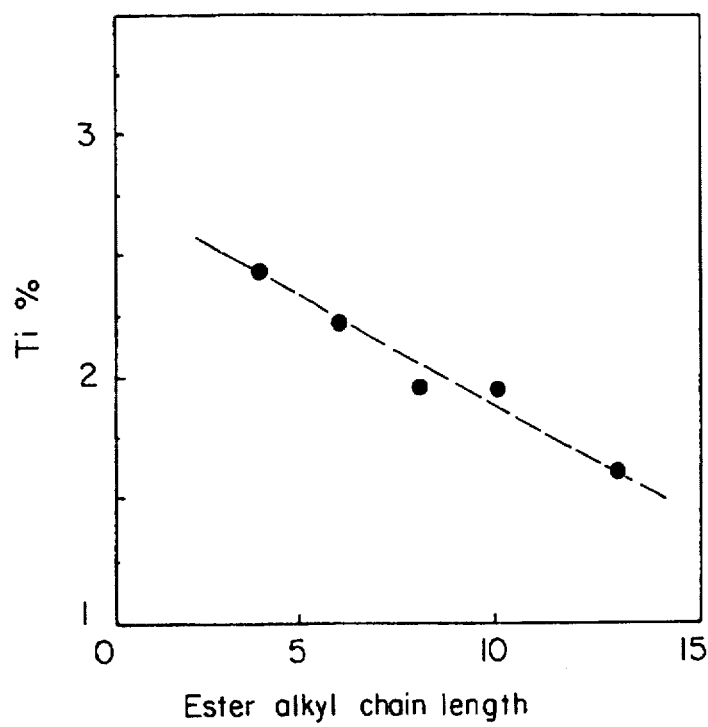
FIG. 2  Total catalyst yield of the catalyst synthesis as a function of the alkyl group chain length in the donor
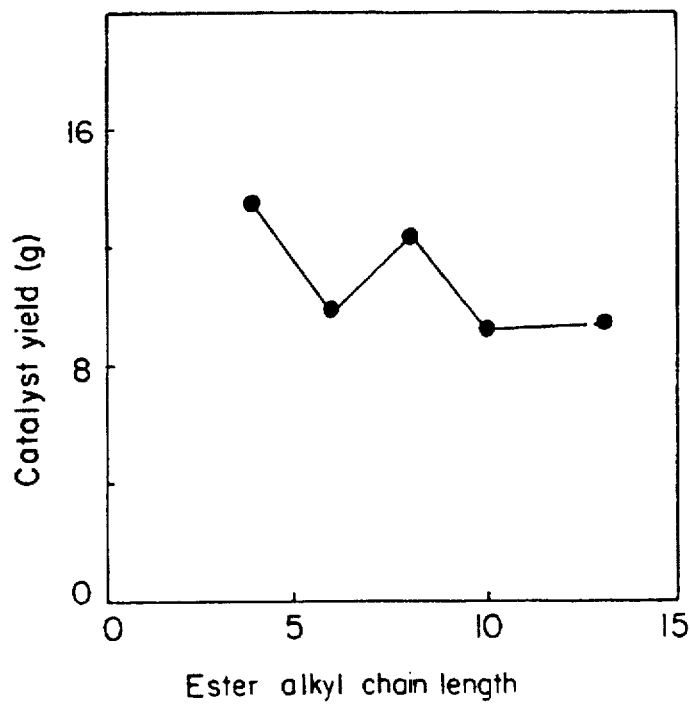

FIG. 3 Concentrations, produced in the catalyst synthesis, of the transesterified donor DEP(A) and the original donors (B)
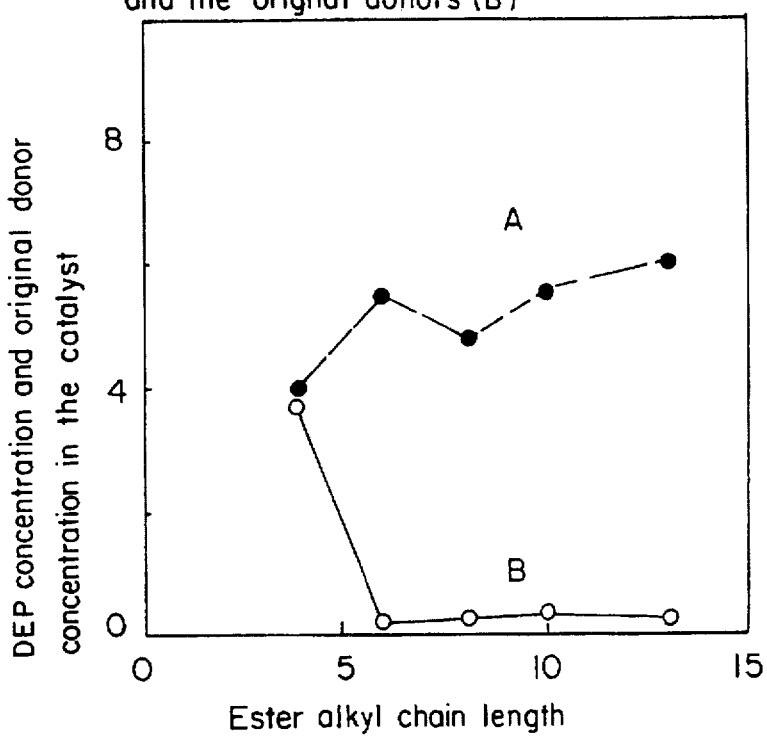
FIG. 4 Diameter of the large particle fraction (<90%) as a function of the alkyl group chain length in the donor
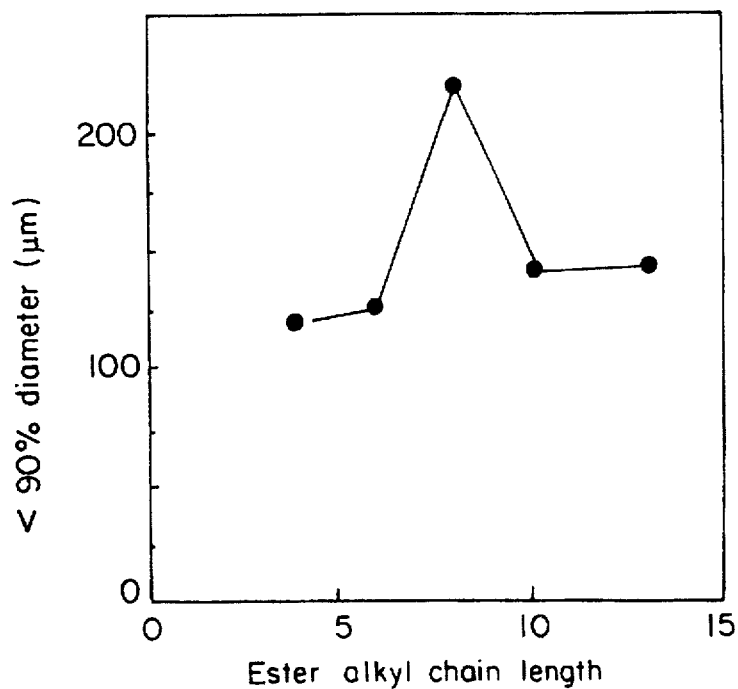

Catalyst particle size distribution when octyl phthalate (C=8) was used as an internal donor Catalyst particle size distribution when decyl phthalate (C=10) was used as an internal donor Catalyst particle size distribution when tridecyl phthalate (C=13) was used as an internal donor MICROSCOPE PICTURE OF THE
CATALYST C-C-4, C = 4,
UNIT = 25μm MICROSCOPE PICTURE OF THE
CATALYST C-C-8, C = 8,
UNIT = 50μm MICROSCOPE PICTURE OF THE
CATALYST C-C-10, C = 8,
UNIT = 50μm FIG. 11  Width (A) and height (B) of the MgCl₂ crystal as a function of the alkyl group chain length in the donor
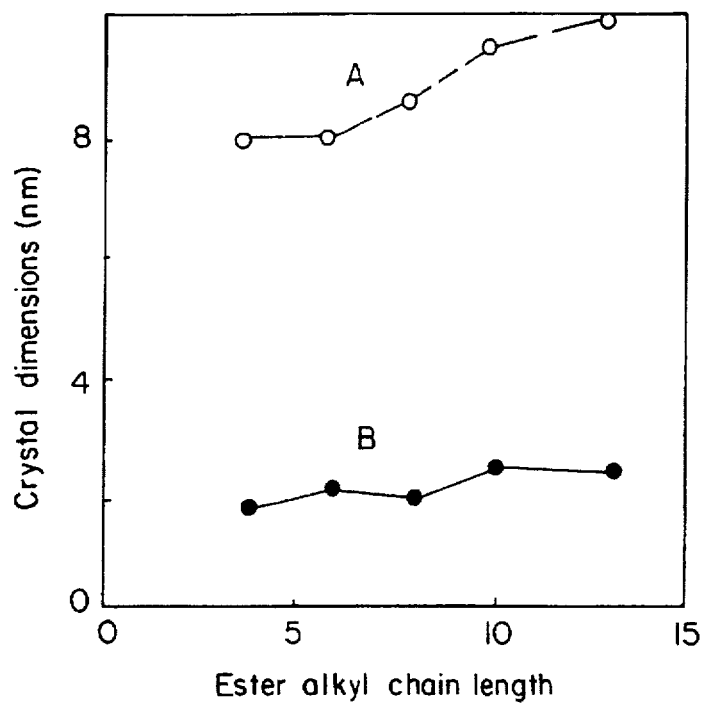
FIG. 12  X-ray pattern of the catalyst C-C-6, in which internal donor prHP has been transesterified to DEP. A double peak is observable at 13-15°.
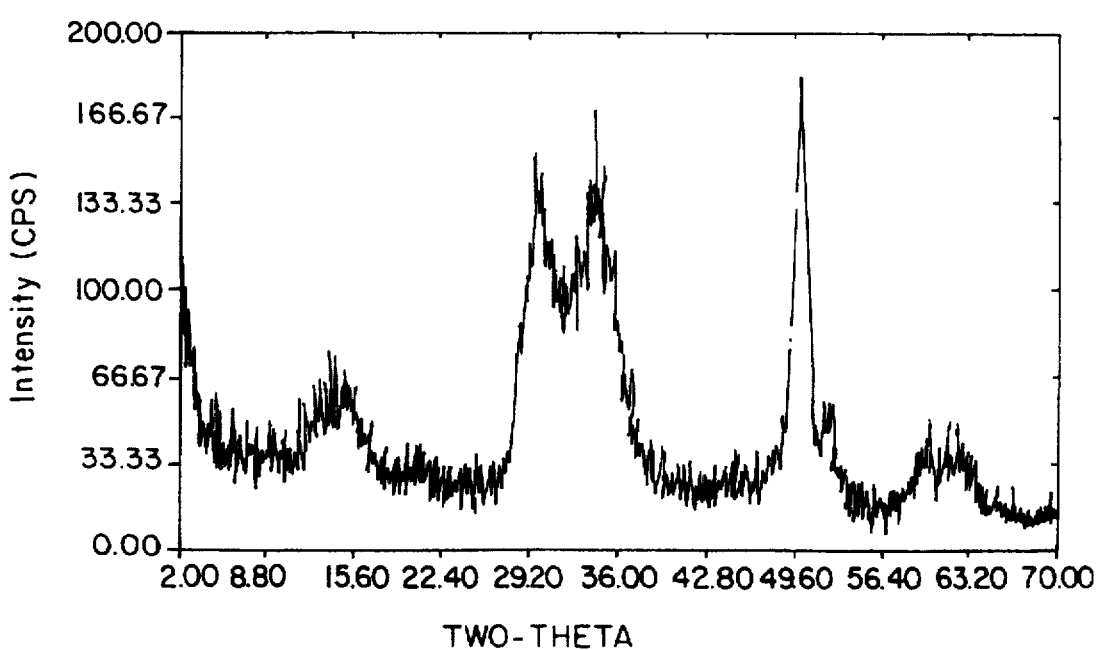

FIG. 13  Catalyst activity as a function of the alkyl group chain lenght in the donor. Curve (A) refers to the unit kg PP/g cat. and curve (B) to the unit kg PP/g Ti
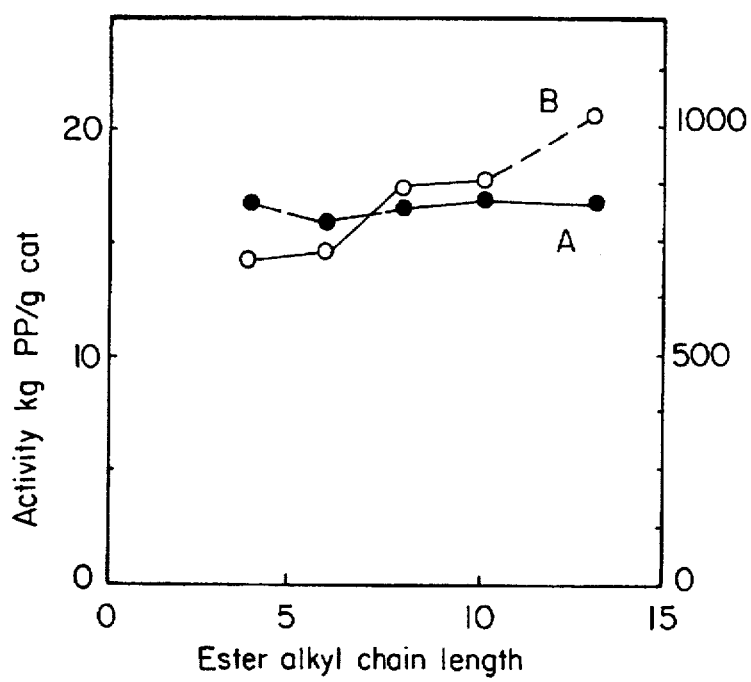
FIG. 17  Total amount of fines fraction (d<1mm) as a function of the alkyl group chain length in the donor
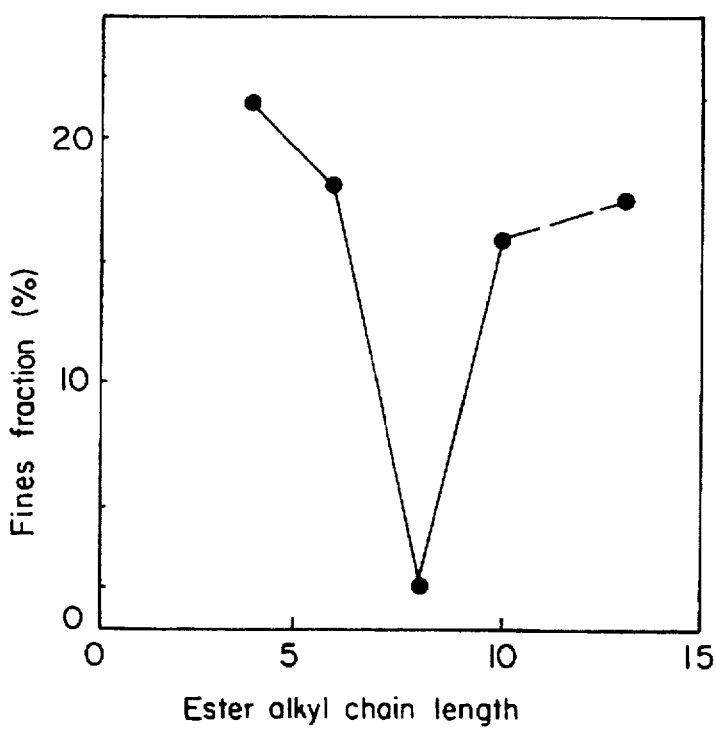

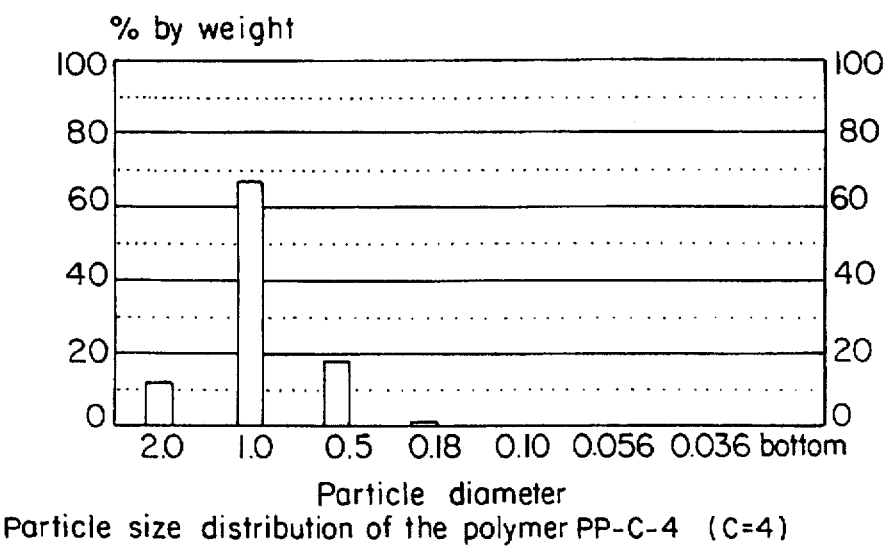
Particle size distribution of the polymer PP-C-4 (C=4)
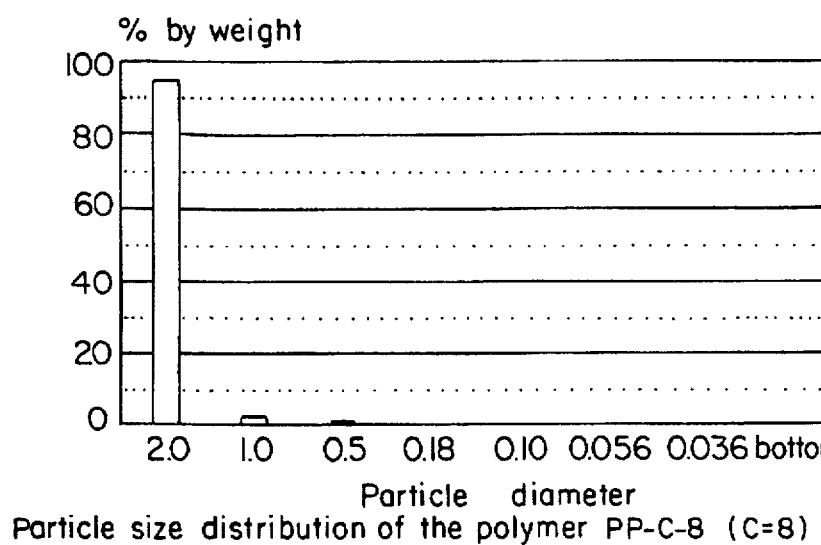
Particle size distribution of the polymer PP-C-8 (C=8)
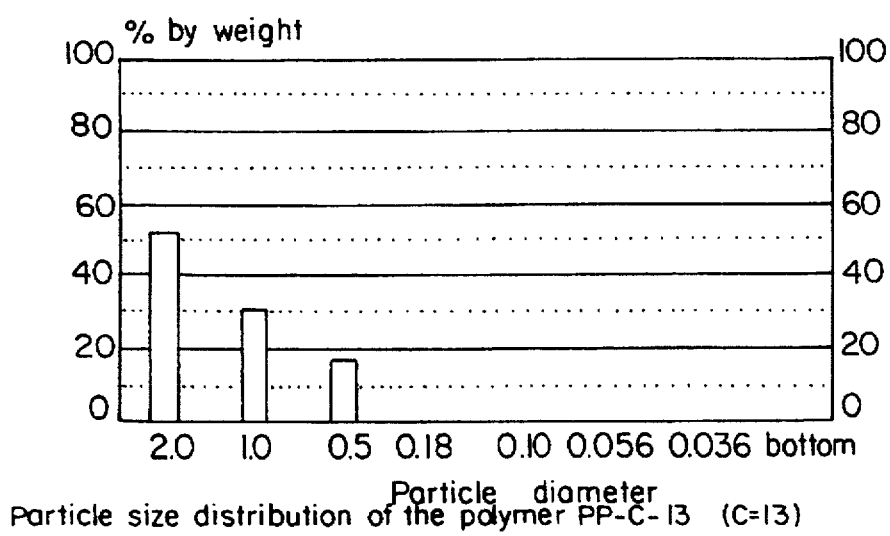
Particle size distribution of the polymer PP-C-13 (C=13)

FIG. 18 Bulk density of the polymers as a function of the alkyl group chain length in the donor
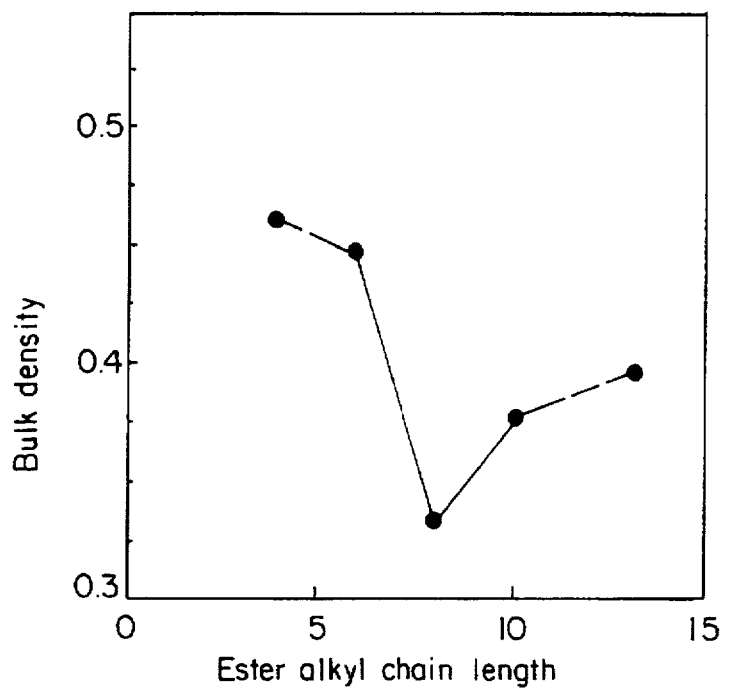
FIG. 22 Crystallization temperature of poloypropylene as a function of the titanation (TiCl4 treatment) temperature used in the catalyst synthesis
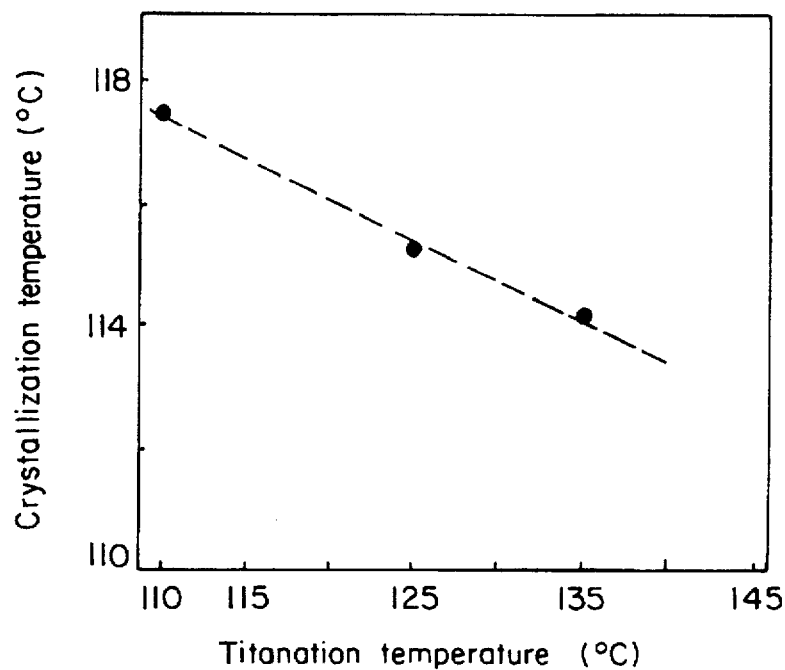

DSC (differential scanning calorimeter) curve of the polymer PP-C-4

DSC curve of the polymer PP-C-8

DSC curve of the polymer PP-C-13

FIG. 23 Pore surface area (m²/g) in the polymers as a function of the alkyl group chain length in the donor
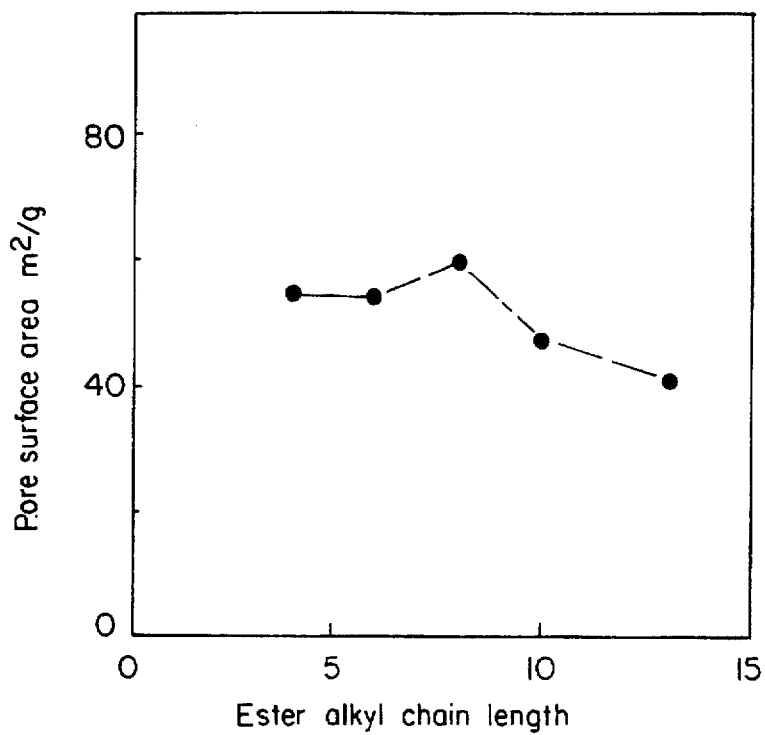
FIG. 24 Pore volume (ml/g) in the polymers as a function of the chain length of the alkyl group in the donor
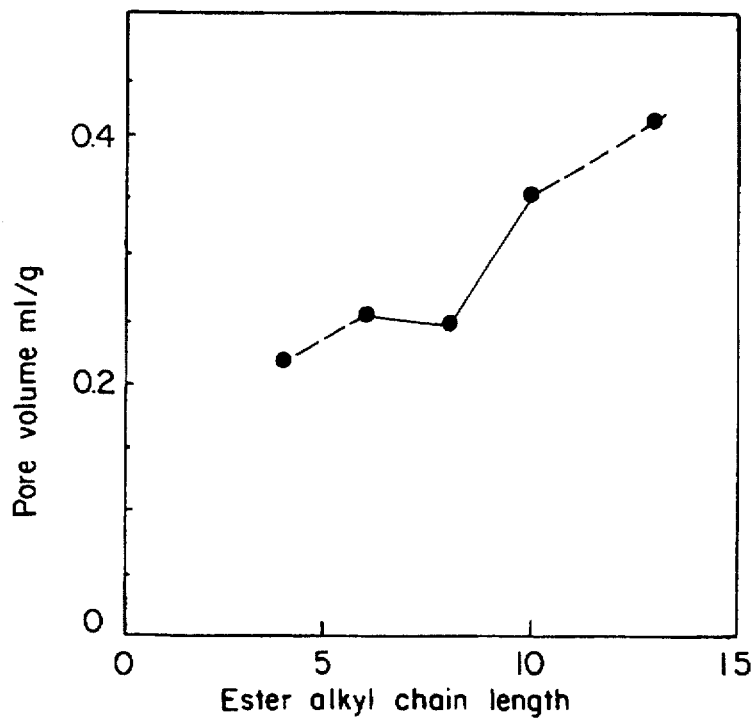

Pore volume distributions of polymers PP-C-8 (A), PP-C-10 (B) and PP-C-13 (C)

COARSE-GRAINED POLYOLEFIN, ITS PRODUCTION METHOD AND A CATALYST USED IN THE METHOD

This application is a continuation of application Ser. No. 08/146,090 filed on Jan. 10, 1994, now abandoned.

BACKGROUND OF THE INVENTION

1. Field of the Invention

The invention relates to a method for preparing polyolefins by polymerizing an olefin with the aid of a procatalyst composition, which has been prepared by contacting $MgCl_2$, a lower alcohol, a titanium compound and a phthalic acid ester.

The invention also relates to a polyolefin which has been obtained by polymerizing an olefin in the presence of a procatalyst, which has been prepared by contacting $MgCl_2$, a lower alcohol, a titanium compound and a phthalic acid ester, as well as a procatalyst composition usable for the preparation of a coarse-grained and an even-grained polyolefin, which has been prepared by contacting $MgCl_2$, lower alcohol, a titanium compound and a phthalic acid ester.

2. Description of the Related Art

Olefins, especially α-olefins, are often polymerized by means of a catalyst composition, in which the procatalyst consists of a compound of a transition metal of groups IV–VI of the periodic system, and the cocatalyst is a compound of a metal of groups I–III of the periodic system, which activates the procatalyst by reduction. The so-called Ziegler-Natta procatalyst has been further developed by using an inert carrier as a support for the transition metal compound, the transition metal compound being superposed on the inert carrier in order to improve the activity of the procatalyst as it catalyzes the polymerization reaction.

However, under the effect of this procatalyst composition, the asymmetrical olefin monomers are often polymerized into different stereoisomeric polymers, yielding, for instance, mixtures of isotactic, atactic and syndiotactic polymers, from which the desired stereoisomer has to be separated by means of washing and similar steps, which are often complicated. In order to prepare a polymer having a basically specific stereospecific form, for instance an isotactic polyolefin, out of an asymmetrical olefin monomer, the effect of the catalyst on the stereospecificity of the yielded product has been enhanced by adding a donor compound to the catalyst.

Owing to its specific steric structure, the donor compound promotes the settling of the monomer molecule into a given position in the catalyst particle at the end of the growing polymer molecule, and thus the molecule chain of the polymer gets a given stereisomeric structure and the polymer product obtained corresponds more or less to the desired product as a function of the selected donor compound.

There are two ways of adding the donor to the catalyst: a so-called internal donor, which is previously added to the procatalyst mixture of the transition metal compound and the carrier, or an external donor, which is added to the mixture of the monomer and the catalyst component only in the polymerization reactor together with the cocatalyst. A donor compound may of course be used in both ways, in which case the internal and external donors may be the same or different compounds.

All monomers are asymmetrical, i.e. stereospecifically polymerizable monomers, except ethene, the unsaturated carbons of which have hydrogen substituents, and also in the rare case in which all the secondary groups are identical, tetramethyl-ethylene for instance. A certain stereospecific form is desirable because the properties of the yielded polymer for a given purpose are enhanced, for example isotactic polyolefins are better crystallized, their bulk density is higher, their mechanical properties are better, being for instance more resistant, etc. The adhesion characteristics of the atactic form are usually better than with other tactic forms and thus they are suitable for glue implementations among others.

When polymerizing asymmetrical olefin monomers, i.e. when at least one of the groups connected to the carbon atoms bound by an unsaturated bond is different, the catalyst may comprise a compound enhancing the stereospecificty of the catalyst, i.e. an electron donor, which, due to its electron donor character, may be connected to some other catalyst structure, and due to its steric action, may guide the monomer molecule of the polymer chain into such a position that the yielded polymer molecule has a stereospecific structure in some respect. Such donors include a great number of various organic compounds, such as esters, carboxylic acids, alcohols, ketones, aldehydes, nitriles, amides, amines, organic phosphorus and silicon compounds, etc. These compounds also have other effects on the characteristics of the catalyst, one such being that the activity of the catalyst varies according to the donor used in each case. If the donor is a carboxylic acid ester, it is usually an aromatic carboxylic acid ester, e.g. benzoates, phthalates, toluates, anisates, etc. The optimal donors among these are dialkyl phthalates.

Due to the so-called replica process, the physical structure of the procatalyst carrier is reproduced throughout the procatalyst composition and eventually also in the polymer product, and this means that the morphology of the procatalyst composition is very important in view of the polymerization.

Combinations of various donors are also known in the field. Thus, the JP patent specifications 59172507, 59206409, 59206415, 59206416, 59206424, 60262804, 61103910 and 61108614 disclose a procatalyst composition, which has been prepared from $MgCl_2$, 2-ethyl hexylalcohol, titanium tetrachloride, di-isobuthyl phthalate and in some cases from phthalic acid anhydride.

The patent family including the patent specifications DE 3 540 699, EP 226 003 and U.S. Pat. No. 4,761,461, discloses a method for preparing propene polymers by means of a procatalyst composition, which has been obtained by contacting $MgCl_2$, alkanol, such as ethanol, phthalic acid ester, such as di-isobutyl phthalate, and titanium tetrachloride under given conditions. The phthalic acid may be added either at the stage when $MgCl_2$ and ROH react with each other, or at the stage when the reaction product of $MgCl_2$ and alkanol is reacted with titanium tetrachloride.

The procatalysts and methods described above have affected the particle size and shape of the polymer product and the particle size distribution to a very small extent. Thus, a great amount of fine fraction has been produced, which is detrimental for the treatment of polyolefins.

SUMMARY OF THE INVENTION

One object of the invention is to provide an active and stereospecific procatalyst composition. Another object is to reduce the titanium and donor contents of the catalyst and thus of the polymer, since these bring about colour problems and aromaticity in the polymers. The purpose is in particular a catalyst and a method which allow to increase the particle size of the polymer and to reduce the share of its fine fraction.

The objects and purposes of the invention have now been achieved by a new method for preparing polyolefins, wherein the olefins are polymerized in the presence of a procatalyst composition which has been prepared by contacting $MgCl_2$, a lower alcohol, a titanium compound, and dioctyl phthalate as the phthalic acid ester; wherein a coarser polyolefin is produced; and wherein the procatalyst is the result of a transesterification between the lower alcohol and the phthalic acid ester at a temperature in the range of 110° to 150° C. The invention also relates to a new polyolefin, which is produced by this process, and a new procatalyst composition suitable for the preparation of coarse-grained and even-grained polyolefins, which is produced by the procatalyst preparation process described above.

Hence, it has been discovered, that when using a procatalyst composition prepared by contacting $MgCl_2$, lower alcohol, a titanium compound and phthalic acid ester, the particle size of the polyolefin product can be increased and the share of the fine fraction decreased by carrying out a transesterification between the lower alcohol and the phthalic acid ester during the preparation of the procatalyst, and by selecting dioctyl phthalate DOP as phthalic acid ester.

BRIEF DESCRIPTION OF THE DRAWINGS

FIGS. 1–4 are graphs that show the influence of the ester alkyl chain length on the content of Ti, the catalyst yield, the donor concentrations and the large particle fraction.

FIG. 9 is a graph which shows the dimensions of the $MgCl_2$ crystal as a function of the alkyl group chain length in the donor.

FIG. 10 shows an X-ray pattern of a catalyst.

FIGS. 11, 13, 17, 18, 23 and 24 are graphs that show the influence of the alkyl group chain length on the crystal dimensions, on the catalyst activity, on the total amount of fines in the product, on the bulk density of the polymers, on the pore surface area and on the pore volume in the polymers.

FIG. 12 shows an X-ray pattern of a catalyst.

FIGS. 14–16 show particle size distribution for various polymers.

FIGS. 22 is a graph which shows crystallization temperature as a function of the titanation temperature.

DETAILED DESCRIPTION OF THE INVENTION

Figure 5:
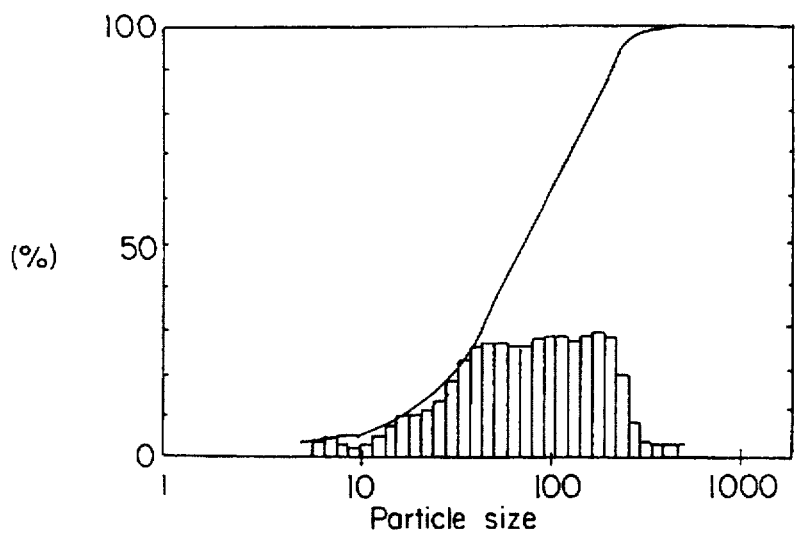
FIGS. 5–7 are graphs that show the particle size distribution of the polymer produced when different phthalates were used as internal donors.

In the polymerization method according to the invention, the $MgCl_2$ carrier of the used procatalyst composition may be used as such or combined with silica, e.g. by absorbing a solution or slurry containing $MgCl_2$ into the silica. It is also important that the $MgCl_2$ used is clean and anhydrous.

The lower alcohol used in the method may be any $C_1$–$C_4$ alcohol. Advantageous alcohols are methanol and ethanol, especially ethanol.

Since, under the effect of the so-called replica process, the physical structure of the catalyst carrier is reproduced throughout the catalyst composition, and this is again reproduced in the yielded polymer product, it is crucial to make the physical structure of the carrier, i.e. the morphology, advantageous, in other words, similar to the desired product.

This can be achieved by using two different procedures, which may of course be combined: chemically, i.e. by treating the carrier with a specific or a number of specific chemicals, or physically, i.e. by grinding the carrier in a ball mill or a jet blowing mill.

One may also proceed by first making an adduct between the carrier, in this case expressly $MgCl_2$, and a lower alcohol, advantageously ethanol, and melting the adduct, injecting the melt by gas into a cooled solvent or a cooled gas, whereby the adduct is crystallized into a morphologically advantageous form, and this crystallized adduct is used as a catalyst carrier (cf. FI 862459).

The titanium compound used for the preparation of the procatalyst composition of the method according to the invention is advantageously an organic or inorganic titanium compound with the oxidation degree 3 or 4. When needed, the titanium compound can be admixed with other transition metal compounds, such as vanadium, zirconium, chromium, molybdene, tungsten compounds. The titanium compound is usually halogenide or oxyhalogenide, an organic metal halogenide or a purely metallorganic compound, in which only organic licands have been bound to the transition metal. Titanium halogenides, in particular $TiCl_4$ are especially advantageous.

The phthalic acid ester used in the method is dioctyl phthalate, since only this substance yields the desired coarseness and low fine fraction content of the polymer product. The advantages are unexpected and differ from the results yielded by other phthalic acid esters. It is also advantageous that the dioctyl phthalate acts as a so-called electron donor of the catalyst composition with the purpose to improve the activity and/or stereospecificty of the obtained polymer. In the synthesis, the molar ratio of the dioctyl phthalate to the magnesium halogenide is advantageously of the order of around 0.2.

The transesterification can be accomplished e.g. by choosing a pair of phthalic acid ester—lower alcohol which is transesterified under normal preparation conditions, either spontaneously or by means of a catalyst that does not damage the procatalyst composition. However, it is often necessary to apply a raised temperature in order to bring about the transesterification. In this case, the transesterification is advantageously carried out at a temperature in the range of 110°–150° C. and preferably in the range of 130°–140° C.

Since the boiling point of liquid $TiCl_4$ under normal pressure is about 136° C., the treatment by means of this, i.e. the so-called titanization, can normally be performed only at a temperature lower than this. Given that hydrocarbon solvents such as heptane, hexane or pentane are usually used as a titanization medium, and these have a markedly lower boiling point, the titanization temperature is below 100° C. in practice, a temperature at which no transesterification takes place. Thus, in order to produce a transesterification, solvents boiling at a higher temperature should advantageously be applied, for instance nonane (boiling point 151° C.) and decane (boiling point 174° C.) are recommended. Thus the boiling point of $TiCl_4$ is approached and even exceeded in terms of the titanization temperature, allowing a simultaneous transesterification reaction.

According to one embodiment, the transesterification takes place so that the adduct of magnesium chloride and lower alcohol $MgCl_2*nR_1OH$, in which n is 1–6, is treated with a titanium compound, e.g. is titanized with $TiCl_4$, apparently generating the following reaction:

(1) 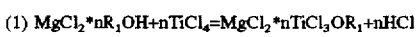

As the donor, i.e. phthalic acid ester, is added to this titanized carrier, an adduct formed by all the components is probably produced:

(2) MgCl₂*nTiCl₃OR₁+nR₃COOR₂=
MgCl₂*nTiCl₃OR₁*nR₃COOR₂

As this adduct can be transesterified at a temperature above 100° C. and advantageously above around 130° C., the ester groups R₁ and R₂ change places:

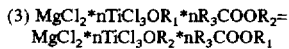

(3) MgCl₂*nTiCl₃OR₁*nR₃COOR₂=
MgCl₂*nTiCl₃OR₂*nR₃COOR₁

As the catalyst residue is removed by extraction, an adduct of the carrier and the ester donor is obtained, in which the group deriving from the ester alcohol has changed:

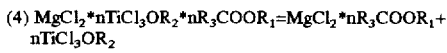

(4) MgCl₂*nTiCl₃OR₂*nR₃COOR₁=MgCl₂*nR₃COOR₁+
nTiCl₃OR₂

In case sufficient titanium remains on the carrier, it will act as an active element of the procatalyst.

Otherwise the titanization is renewed after the above treatment in order to ensure a sufficient titanium concentration and thus an activity. The titanium separation of formula (4) relates to the inactive part of the titanium.

Consequently, a procatalyst composition for the polymerization of olefins has been provided in the present invention, the composition having a low titanium and donor content with regard to the activity of the catalyst. According to one embodiment, the procatalyst composition contains 2.0% by weight of Ti at the most. Its molar ratio donor/mg is advantageously in the range of 0.03–0.06 and/or its donor concentration in the range of 4–6% by weight. The phthalic acid ester alkoxy group has 8 carbon atoms, whereby the activity of the procatalyst composition is advantageously around 800 kg PP/g Ti when using triethyl aluminum as a catalyst and cyclohexylmethyl dimethoxysilane as an external donor.

The procatalyst composition for the polymerization of olefins according to the invention is advantageously prepared a) by reacting the adduct of MgCl₂ and lower alcohol with the titanium compound, b) by reacting the product of step a) with dioctyl phthalate under conditions in which the transesterification of dioctyl phthalate and lower alcohol takes place, c) by washing the product, d) by optionally reacting the end product of step c) with the titanum compound (i.e. a second treatment).

In the polymerization method according to the invention, the polymerization is advantageously carried out in the presence of an organometallic cocatalyst, such as trialkyl aluminum (e.g. triethyl aluminum), and advantageously of an external donor similar to cyclohexylmethyl dimethoxysilane. The polymer produced according to the invention contains a small amount of titanium and donor, among others, and resembles morphologically a relatively coarse catalyst composition. Propene is an advantageous olefin monomer.

According to a preferred embodiment of the invention, the catalyst and/or polymer particles are formed by agglomerating a more finely divided material. The catalyst particles produced advantageously have a size distribution such that 90% by weight has an average diameter above 200 μm. The average diameter of the corresponding polymer particles is advantageously of the order of around 1–2 mm, particles having a diameter under around 1 mm being preferably absent.

An olefin polymerization method is described as an exemplified case below, in which propene is polymerized with a catalyst composition, in which a spray crystallized MgCl₂×3 EtOH adduct is used as a carrier, which has subsequently been titanized with TiCl₄ in a hydrocarbon solvent in the presence of di-alkyl phthalates of various lengths. By means of the procatalyst composition and the trialkyl aluminum cocatalyst (triethyl aluminum TEA) thus obtained as well as of an external donor (cyclohexyl methoxy dimethylsilane CMMS) the propene was polymerized in a hydrocarbon solvent. If a sufficiently high titanizing temperature is applied, a transesterification will take place between the ethoxy groups deriving from the carrier-adduct and the long alkyl groups of the donor, yielding diethyl phthalate (DEP) as a donor compound. The following examples are merely intended to illustrate the invention.

EXAMPLES

Examined Donors 5 donors were examined in the test series. The donors are given in table 1. The donors examined were propylhexyl phthalate (PrHP), dioctyl phthalate (DOP), di-isodecyl phthalate (DIDP) and ditridecyl phthalate (DTDP). Diisobutyl phthalate (DIBP) was also included in the test series.

TABLE 1

| | Examined internal donors | | | |
|---|---|---|---|---|
| Test | Length of the alkyl group | Donor | Molar mass g/mol | Density g/ml |
| 1 | 4 | DIBP | 278 | 1.00 |
| 2 | 6 | PrHP | 292 | 0.95 |
| 3 | 8 | DOP | 390 | 0.96 |
| 4 | 10 | DIDP | 446 | 0.96 |
| 5 | 13 | DTDP | 530 | 0.91 |

Catalyst synthesis 0.1 moles of MgCl₂×3 EtOH was suspended under inert circumstances in 250 ml of decane in a reactor. The solution was cooled to a temperature of −15° C. and 300 ml of cold TiCl₄ was added. This was followed by a controlled heating to a temperature of +20° C. At this temperature, 0.02 moles of internal donor was added. In all the catalyst syntheses, the molar ratio between the donor and MgCl₂ was 0.2. When all the synthesis reagents were present, the temperature was raised to 135° C. Both the first and the second titanization were carried out at this temperature. The catalyst synthesis was ended by performing a normal washing of the reaction mixture.

In order to investigate the particle size of the produced procatalyst, the particle size distribution of the product was measured and each sample was microscopically photographed. In addition, the chemical composition of the procatalyst was measured by analyzing their T, Mg and donor contents. In order to examine the changes in the crystal structure, X-ray diffraction spectrums were also taken.

Test Polymerization

All the catalysts were submitted to a test polymerization under the following polymerizing conditions. A 2 liter bench reactor was used as a reaction vessel. 20–30 mg of procatalyst was used in the test polymerization. This amount was mixed with 620 μl of tritethyl aluminum and 200 μl of a 25% solution of CMMS in 30 ml of heptane. The polymerizations were carried out at a temperature of +70° C. and under a propene monomer pressure of 10 bar. The partial pressure of hydrogen was 0.2 bar during the polymerization. The polymerization lasted 3 hours. At the beginning of the test, the prepolymerization took place during the 10 minutes in the course of which the temperature and the pressure reached the desired polymerization conditions. The activity was measured on the basis of the polymerization yield. The soluble portion of the polymer was measured by evaporating a measured portion from the polymerization solution. Under these standard polymerization conditions, a polymer material was prepared. the MFR ( ... ) of which was approx. 8.

Characterization of the polymerization batches

The bulk density and particle size distribution (PSD) of all the polymerization drives were measured. The sotacticty index was measured with the help of heptaneluation and the isotacticity was determined on the basis of the results obtained from the evaporation residue measurements. The melt viscosity was measured at a temperature of 230° C. by using a weight of 2.16 kg. All the polymerization batches were microscopically photographed in view of further documentation and comparisons. In order to characterize the melt behavior of the material, differential scanning calorimetric curves (DCS curves) were carried out. The specific area and the pore volume distribution were measured with the aid of Hg porosimetric equipment.

Results

Table 2 presents the symbols of all the catalysts and the corresponding polymers.

TABLE 2

Symbols of the catalysts and polymers used in the study

| Alkyl group length | Catalyst symbol | Polymer symbol |
|---|---|---|
| 4 | C—C—4 | 1 PP—C—4 |
| 6 | C—C—6 | 2 PP—C—6 |
| 8 | C—C—8 | 3 PP—C—8 |
| 10 | C—C—10 | 4 PP—C—10 |
| 13 | C—C—13 | 5 PP—C—13 |

Titanium content of the catalyst

Table 3 indicates the magnesium and titanium contents of the catalysts. The titanium content is also presented in FIG. 1. The results showed that, with a substantially constant Mg content, a systematic decrease of the Ti content was observed in the catalyst series. The longer the alkyl chain of the alkoxy group of the electron donor, the smaller the Ti content of the final procatalyst. The Ti content of the last catalyst in the range was 1.6% by weight. This is a 60% lower value than the 4% obtained in the standard synthesis and up to 30% lower than the titanium content found in commercial high yield catalysts. These results showed that the combination of transesterification and the washing effect of $TiCl_3 \times OEt$ is enhanced by using higher phthalic acid esters.

TABLE 3

Mg and Ti contents of the catalysts

| Alkyl chain length | Mg (%) | Ti (%) |
|---|---|---|
| 4 | 18.1 | 2.4 |
| 6 | 20.8 | 2.2 |
| 8 | 22.0 | 1.9 |
| 10 | 20.0 | 1.9 |
| 13 | 17.3 | 1.6 |

Catalyst yield of the catalyst synthesis

Table 4 indicates the respective catalyst yields of each catalyst synthesis, and the results are graphically presented in FIG. 2. The same trend can be observed as in the first measurement, i.e. as the phthalic alkyl chain increases and the titanium content decreases, the catalyst yield also decreases. The yield is very slightly reduced, only 25%, which is explained by the decreased $TiCl_4$ content of the catalyst and the weight reduction produced by the replacement of an electron donor with a high molar mass by one with a lower molar mass. The reduced catalyst yield is also explained by the reduction of the total donor content.

TABLE 4

Catalyst yield of the catalyst synthesis

| Alkyl group length | Yield (g) |
|---|---|
| 4 | 13.3 |
| 6 | 10.0 |
| 8 | 12.4 |
| 10 | 9.1 |
| 13 | 9.2 |

Donor content of the catalysts

The donor composition of the catalysts was measured by liquid chromatography by using the HPLC method. The results are listed in Table 5 and are graphically presented in FIG. 3. In all the catalysts, a small fraction of mixed esters and a small fraction of phthalic acid anhydride were observed. As seen in FIG. 3, the transesterification was not complete for the first catalyst of the test series. The transesterification degree of DIBP was only 70%. This implies that DIBP is not completely transesterified at a temperature of 135° C. In all the other syntheses, the transesterification was complete. Only traces of the original ester were found in their products. The amount of transesterified DEP diethyl phthalate found in the catalysts was essentially constant and near 5%. This equals a D/Mg ratio of 0.03–0.04 (D =donor), which is even a lower value than the one obtained as DIBP was transesterified at a temperature of 143° C.

These results show that the transesterification is improved if longer alkyl chains are used in the phthalic acid esters. They also show that a low molar ratio electron donor/$MgCl_2$ is obtained.

TABLE 5

Donor composition of the catalysts.
PA = acid anhydride and IE = mixed esters produced during the trans-esterification

| Alkyl group length | Original (%) | DEP (%) | PA (%) | IE (%) |
|---|---|---|---|---|
| 4 | 3.6 | 4.0 | 1.3 | 1.0 |
| 6 | 0.2 | 5.3 | 0.3 | 0.9 |
| 8 | 0.3 | 4.8 | 0.7 | 0.4 |
| 10 | 0.4 | 5.3 | 1.1 | 0.5 |
| 13 | 0.2 | 5.9 | 0.7 | 0.4 |

Particle size distribution of the catalysts (PSD)

Figure 6:
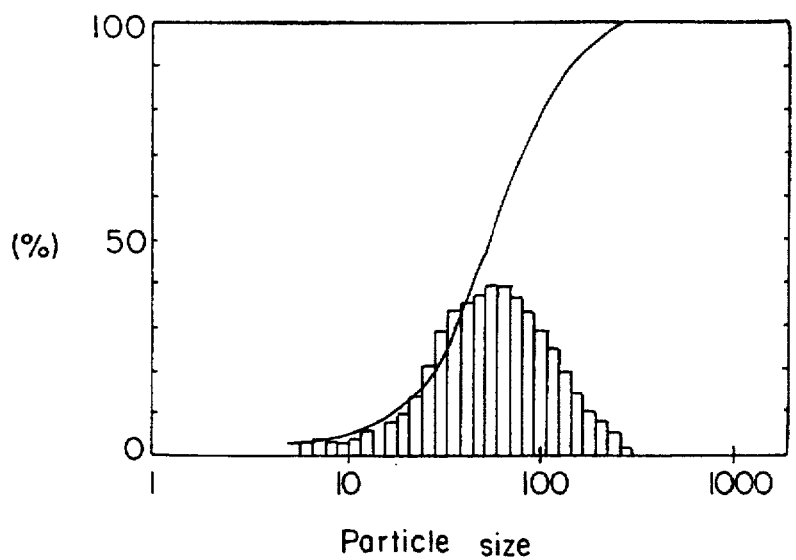
Figure 7:
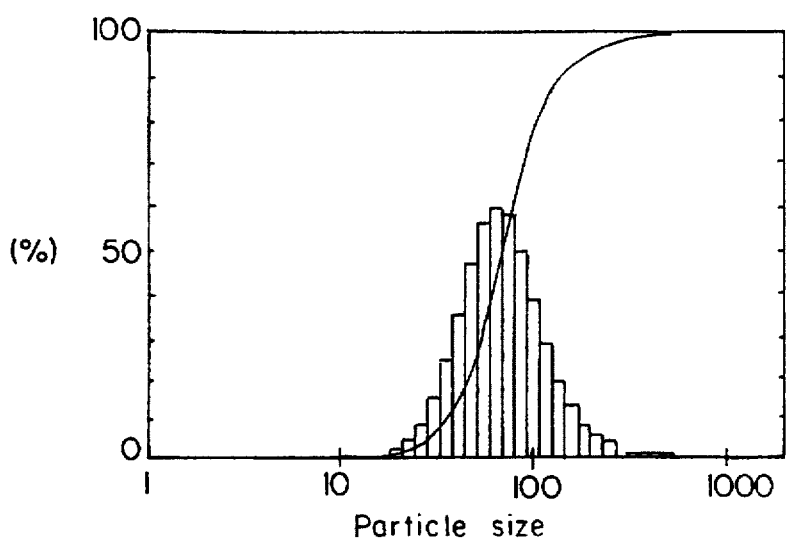
Figure 8:
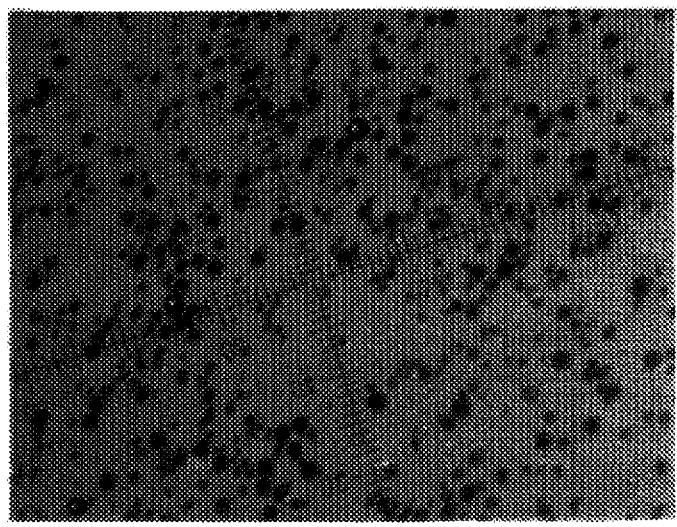
FIGS. 8–10 are photographs that show microscopic structures of various catalysts.
Figure 9:
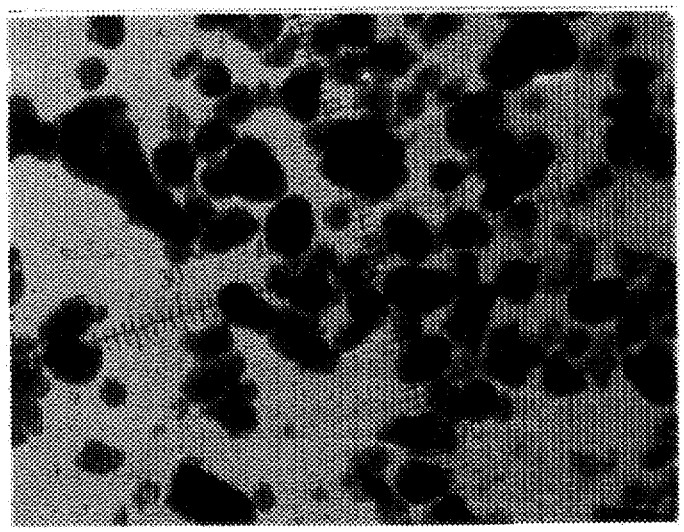
Figure 10:

The PSD of the catalysts was also measured and the results are given in Table 6. FIG. 4 shows the share in which more than 90% of the particles had an average particle diameter as a function of the alkyl chain length. The results show that a change of the donor compositions entails a marked change of the PSD. At the same time it was noted that the catalyst particles agglomerate as higher phthalic acid esters are being used. The effect was most drastic when dioctyl phthalate was used, appearing as a noticeable agglomeration. This agglomeration appears in the PSD curves of FIGS. 5, 6 and 7, as well as the microscopic pictures in FIGS. 8, 9 and 10. The results also showed that the agglomeration decreased again when higher phthalic acid esters were used. By using DIDP (C=10), very beautifully shaped catalyst particles were obtained, having a diameter of about 140 µm. This appears from FIG. 10.

TABLE 6

Particle size distribution of the catalysts

| Alkyl group length | D (0.9) μm | D (0.5) μm | D (0.1) μm |
|---|---|---|---|
| 4 | 117 | 62 | 34 |
| 6 | 127 | 68 | 36 |
| 8 | 218 | 76 | 17 |
| 10 | 138 | 56 | 18 |
| 13 | 140 | 69 | 36 |

X-ray diffraction spectrums of the catalysts

The tranesterification yielded a new procatalyst structure, which appears in the double peak at 13°–15°. In order to observe the effect of higher phthalic esters X-ray diagrams were taken of all the catalysts in the test series. Table 7 lists the crystal dimensions deduced from the diagrams and the results are also shown in FIG. 11. According to the results, the crystal was systematically broadened as the alkyl chain of the ester was lengthened. DTDP yielded 25% broader crystals than DIBP.

FIG. 12 shows the X-ray diffraction spectrum of the catalyst C—C-6. According to the diagram, recrystallization appeared in the MgCl$_2$ crystal grating, showing as a sharpening of the crystal peak at 30° and 35°. The forming of the double peak at 13°–15° can also be seen.

TABLE 7

Crystal dimensions of the MgCl$_2$ materials of the catalysts Section levels

| Alkyl group length | Height (nm) | Width (nm) | Growth (%) |
|---|---|---|---|
| 4 | 1.8 | 7.9 | 0 |
| 6 | 2.1 | 7.9 | 0 |
| 8 | 1.9 | 8.4 | 6 |
| 10 | 2.3 | 9.3 | 18 |
| 13 | 2.2 | 9.8 | 24 |

Area and pore volume of the catalysts

The area and the pore volume of the catalysts were measured. The results are listed in Table 8. According to these, the area of the catalysts remained almost constant regardless of the donor used in the synthesis. The specific area obtained was of the order of about 300 m$^2$/g. Conversely, the pore volume increased as donors with longer chains were used. In the last catalyst of the series an increase of up to 60% was observed. The increase of the pore volume can partly be explained by the agglomerizing of the catalyst particles.

TABLE 8

Specific area and pore volumes of the catalysts

| Alkyl group length | Area (m$^2$/g) | Pore volume (ml/g) |
|---|---|---|
| 4 | 348 | 0.524 |
| 6 | 316 | 0.738 |
| 8 | 311 | 0.581 |
| 10 | 339 | 0.776 |
| 13 | 292 | 0.814 |

Activity of the catalysts

All the catalysts were test polymerized in the conditions described above. The results are given in Table 9 and FIG. 13. The activity based on the weight of the catalyst and the polymer remained constant for the entire catalyst range and was about 16 kg/g of catalyst. Expressed as the unit kg PP/g of Ti, the activity increased systematically. This was due to the fact that the Ti content decreased accordingly as higher phthalic acid esters were used. Thus, an activity value of 1019 kg PP/g of Ti was obtained for the last catalyst in the range. When decane was used as an activating medium, the activity of the catalyst decreased slightly.

TABLE 9

Activity of the catalysts

| Alkyl group length | Activity (kg PP/g of cat.) | Activity (kg PP/g of Ti) |
|---|---|---|
| 4 | 16.6 | 692 |
| 6 | 15.6 | 709 |
| 8 | 16.2 | 853 |
| 10 | 16.6 | 874 |
| 13 | 16.3 | 1019 |

Particle size distribution (PSD) of the polymers

Table 10 shows the PSD of the polymers together with a mine fraction, i.e. the total amount of particles under 1 mm. The amount of the fine fraction is also graphically presented in FIG. 17.

The PSFD results of the polymers follow the same pattern as the PSD results of the catalysts, i.e. a marked agglomerating effect was observed especially with DOP esters. When still greater chain lengths were used, the agglomerating trend decreased. This appears in the PSD diagrams of FIGS. 14, 15 and 16. The share of the fine fraction (D<1 mm) was generally high (>15%), however for DOP it was practically non-existent. The absence of the fine fraction can be explained by the agglomerzation in this case.

TABLE 10

Particle size distribution fo the polymers

| Alkyl content/ number of C atoms | Share (% by weight) of the material having a diameter d (mm) within the following range | | | | | | |
|---|---|---|---|---|---|---|---|
| | d>2.0 | 2.0>d >1.0 | 1.0>d >0.5 | 0.5>d >0.18 | 0.18>d >0.1 | 0.1>d >0.056 | d<0.056 |
| 4 | 12 0 | 67.4 | 18.5 | 1.8 | 0 2 | 0.1 | 20.6 |
| 6 | 10.7 | 71.3 | 17.7 | 0.2 | 0.1 | 0.0 | 18.0 |
| 8 | 95.0 | 3.1 | 1.1 | 0.5 | 0.2 | 0.1 | 1.9 |
| 10 | 14.6 | 69.4 | 15.5 | 0.5 | 0.2 | 0.0 | 16.0 |
| 13 | 52.1 | 30.4 | 17.1 | 0.2 | 0.1 | 0.1 | 17.5 |

Bulk density of the polymers

The bulk density decreased as higher phthalic acid esters were used in the transesterification synthesis. The results are listed in Table 11 and presented in FIG. 18. According to the figure, the bulk density is actually a function of the agglomerating tendency. The more the polymer is agglomerated, the lower the bulk density. When DIBP esters are used, there is practically no agglomeration, whereby the bulk density will be 0.46 g/ml. If again DOP esters are used, a marked agglomeration will take place and the bulk density drops to 0.33 g/ml.

TABLE 11

Bulk density of the polymers

| Alkyl group length | Bulk density (g/ml) |
|---|---|
| 4 | 0.46 |
| 6 | 0.44 |

TABLE 11-continued

| Bulk density of the polymers | |
|---|---|
| Alkyl group length | Bulk density (g/ml) |
| 8 | 0.33 |
| 10 | 0.37 |
| 13 | 0.39 |

Melt viscosity of the polymers

The chain length of the ester did not have a great impact on the melt viscosity. The results are shown in Table 12.

TABLE 12

| Melt viscosity of the polymers | |
|---|---|
| Alkyl group length | Melt viscosity (2.16 kg) |
| 4 | 10.5 |
| 6 | 9.3 |
| 8 | 10.0 |
| 10 | 7.3 |

Molecular weight of the Polymers

No systematic changes in the molecular weight distribution were observed as the esters changed. All the results are listed in Table 13. The results correspond to the ones normally obtained in standard polymerization.

TABLE 13

| Molecular weight distribution of the polymers | | | | |
|---|---|---|---|---|
| Alkyl group length | Mn | Mw | Mv | D |
| 4 | 58 100 | 273 000 | 223 000 | 4.7 |
| 4 | 58 100 | 274 000 | 222 000 | 4.7 |
| 6 | 56 000 | 281 000 | 225 000 | 5.2 |
| 6 | 55 200 | 289 000 | 233 000 | 5.2 |
| 8 | 60 100 | 273 000 | 221 000 | 4.6 |
| 8 | 60 700 | 279 000 | 228 000 | 4.6 |
| 10 | 73 800 | 331 000 | 269 000 | 4.5 |
| 10 | 74 600 | 334 000 | 270 000 | 4.5 |

DSC measuring results of the polymers

Figure 19:
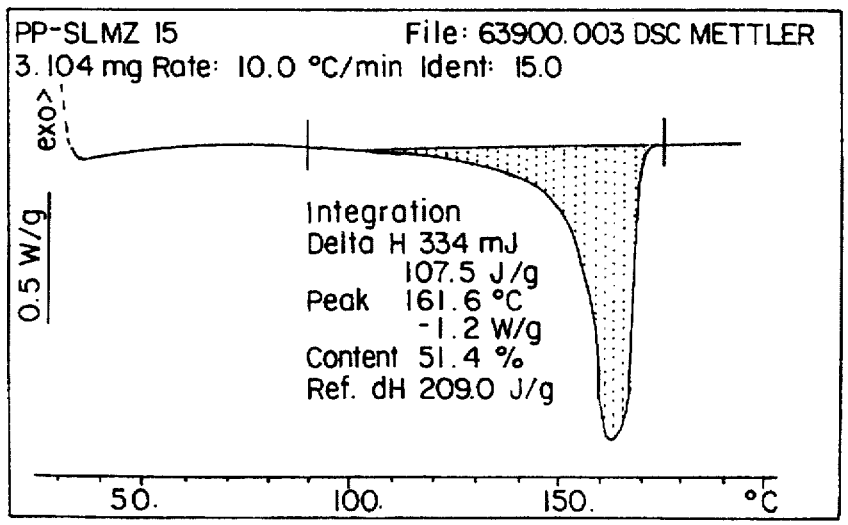
FIGS. 19–21 show a number of fusion curves.
Figure 20:
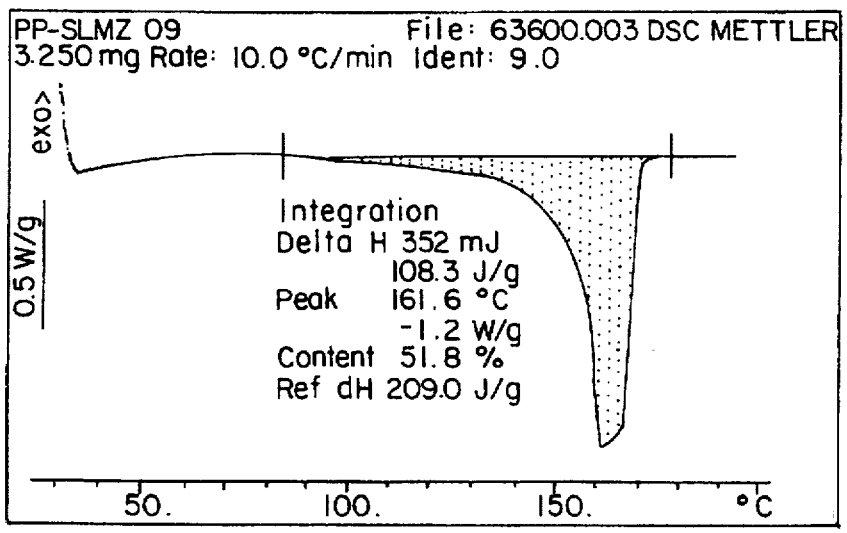
Figure 21:
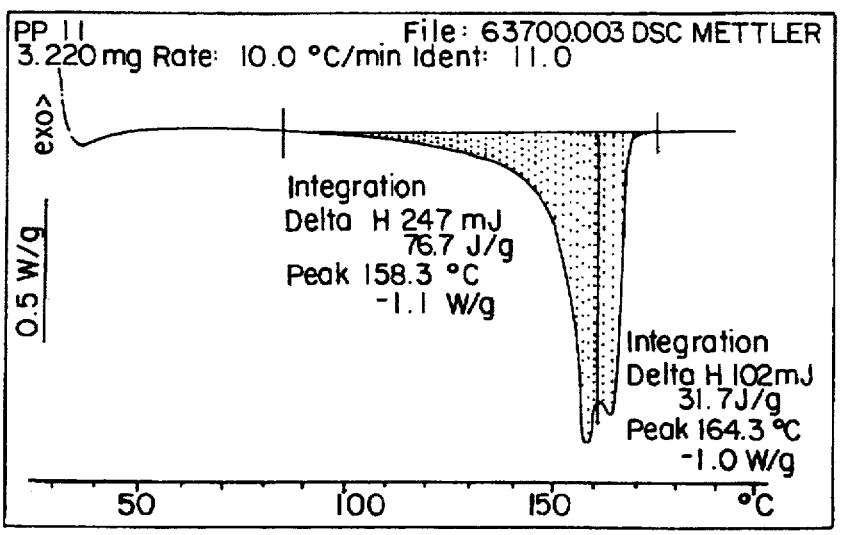

Table 14 presents a list of fusion points, crystallization points and crystallization percentages of the polymers. These measurements did not reveal any systematic dependency of the esters used. The point of fusion is about 161° C. and the crystallization temperature about 114° C. The crystallization was about 51-52%. A number of fusion curves are presented in FIGS. 19, 20 and 21.

It can be generally noted that there is a correlation between the titanization temperature and the crystallization temperature of the catalyst. A higher titanization temperature yields a purer catalyst and a more homogenous polypropene. This again increases the crystallization of the polymer and reduces its crystallization temperature. FIG. 22 presents a schematic view of the correlation between the titanization temperature of the catalyst and the crystallization temperature of the polymer.

TABLE 14

| Fusion temperature, crystallization temperature and crystallization percentage of the polymers | | | |
|---|---|---|---|
| Alkyl group length | Fusion point (°C.) | Cryst. point (°C.) | Crystall. (%) |
| 4 | 161.6 | 114.1 | 51.4 |
| 6 | 161.0 | 113.5 | 50.7 |
| 8 | 161.6 | 113.4 | 51.8 |
| 10 | 161.6 | 114.7 | 52.7 |
| 13  158.3 | 164.3 | 114.8 | 51.9 |

Specific area and pore volume distribution of the polymers

Figure 25:
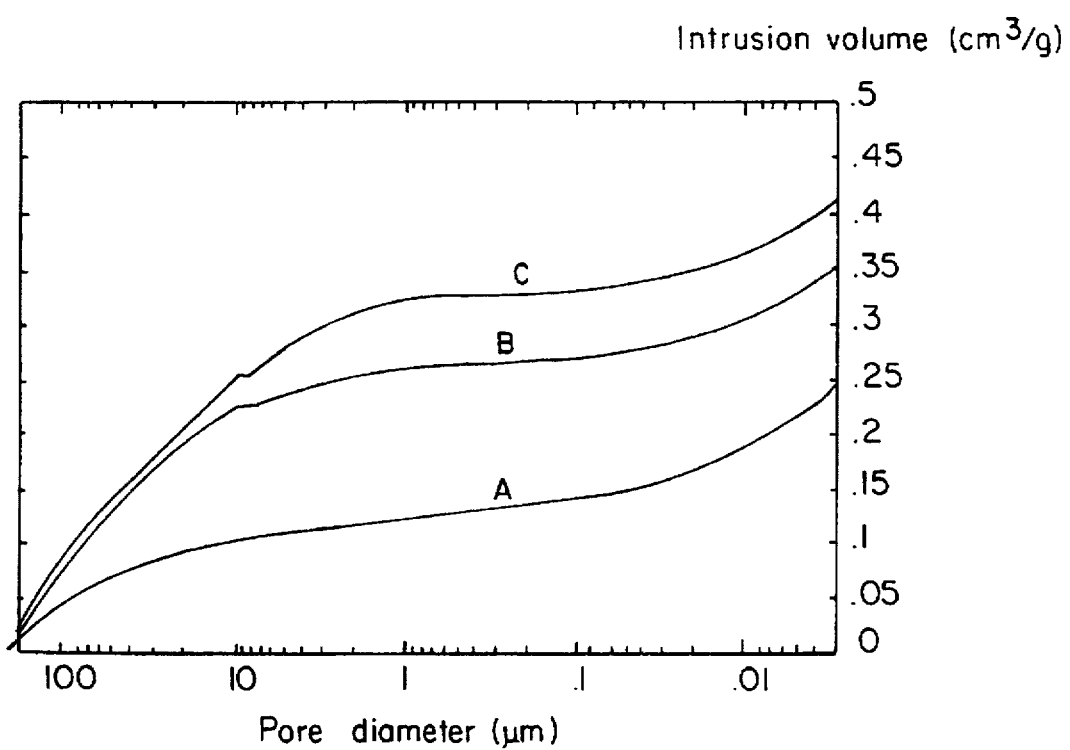
FIG. 25 is a graph which shows pore volume distribution in various polymers.

Table 15 gives the results of the area and pore volume measurements. The measurements were carried out by means of an Hg porosimeter. The results corresponded to the ones obtained with the corresponding catalysts. As shown in FIG. 23, the specific area of the pores decreases only slightly when higher phthalic acid esters are used in the transesterification synthesis. The pore volume, again, increased linearly according to the alkyl chain length of the phthalic acid ester, as in FIG. 24. The increase was about 100% for the last polymer of the range, compared to the first polymer of the range. According to FIG. 25, DIDP greatly increased the share of the macroporous fraction (10–100 μm), whereas DTDP increased the share of the micropores (1–10 μm).

TABLE 15

| Specific area and pore volume of the polymers, median diameter of the pores | | | |
|---|---|---|---|
| Alkyl group length | Area (m²/g) | Pore volume (ml/g) | Pore diameter (μm) |
| 4 | 53.5 | 0.22 | 1.2 |
| 6 | 52.4 | 0.25 | 4.9 |
| 8 | 58.5 | 0.24 | 1.5 |
| 10 | 46.0 | 0.35 | 26.3 |
| 13 | 41.2 | 0.41 | 18.8 |

What is claimed is:

1. A procatalyst composition for preparing polyolefins that is produced by a process comprising:

(a) contacting $MgCl_2$, a lower alcohol $R_1OH$, wherein $R_1$ is a $C_1$–$C_4$ alkyl, and a titanium compound to form a first reaction product composition, (b) reacting said first reaction product composition with a first phthalic ester $Ph(COOR_2)_2$, wherein Ph is phenylene and $R_2$ is octyl, at a temperature in the range of 130° to 140° C. to form a solid transesterification product containing a second phthalic acid ester comprising the moiety $Ph(COOR_1)$ wherein Ph is phenylene and $R_1$ is said $C_1$–$C_4$ alkyl, and (c) recovering said solid transesterification product as said procatalyst composition.

2. The procatalyst composition according to claim 1, wherein the transesterification is carried out in a solvent having a boiling point above the transesterification temperature and selected from the group consisting of nonane and decane.

3. The procatalyst composition according to claim 2, wherein the lower alcohol is ethanol.

4. The procatalyst composition according to claim 3, wherein the titanium compound is $TiCl_4$.

5. The procatalyst composition according to claim 1, wherein 90% by weight of its particles have an average diameter with a length above 20 μm.

6. The procatalyst composition according to claim 1, wherein its particles are agglomerates.

7. The procatalyst composition according to claims 1, wherein the lower alcohol is ethanol.

8. The procatalyst composition according to claim 7, wherein the titanium compound is $TiCl_4$.

9. A procatalyst composition for preparing polyolefins, said composition being produced by a process which comprises:

- (a) mixing together (i) $MgCl_2$, (ii) a lower alcohol $R_1OH$, wherein $R_1$ is a $C_1$–$C_4$ alkyl, and (iii) a titanium compound, to form a mixture comprising a first reaction product composition,

- (b) contacting said first reaction product composition in said mixture with a first phthalic ester $Ph(COOR_2)_2$, wherein Ph is phenylene and $R_2$ is octyl, and heating the resultant mixture at a temperature in the range of 130° to 140° C. to form a solid transesterification product containing a second phthalic acid ester comprising the moiety $Ph(COOR_1)$ wherein Ph is phenylene and $R_1$ is said $C_1$–$C_4$ alkyl, and

- (c) separating from the resultant mixture and recovering said solid transesterification product as said procatalyst composition.

10. The procatalyst composition of claim 9, wherein said solid transesterification product is further reacted with the titanium compound at a temperature in the range of 130° to 140° C. to produce a further titanated procatalyst composition.

11. A method for producing a polyolefin, comprising the steps of (1) polymerizing an olefin in the presence of a procatalyst composition, that is prepared by a process comprising:
- (a) reacting $MgCl_2$, a lower alcohol $R_1OH$, wherein $R_1$ is a $C_1$–$C_4$ alkyl, and a titanium compound to form a first reaction product composition,
- (b) reacting said first reaction product composition with a first phthalic acid ester $Ph(COOR_2)_2$, wherein Ph is phenylene and $R_2$ is octyl, at a temperature in the range of 130° to 140° C. to form a solid transesterification product containing a second phthalic acid ester comprising the moiety $Ph(COOR_1)$ wherein Ph is phenylene and $R_1$ is said $C_1$–$C_4$ alkyl, and
- (c) recovering said solid transesterification product as said procatalyst composition; and (2) recovering said polyolefin.

12. The method according to claim 11, wherein the olefin that is polymerized in the method is propene.

13. The method according to claim 11 or 12, wherein the lower alcohol is ethanol.

14. The method according to claim 13, wherein the titanium compound is $TiCl_4$.

15. The method according to claims 11 or 12, wherein the titanium compound is $TiCl_4$.

16. The method according to, claim 11 wherein the olefin is polymerized in the presence of a trialkyl aluminum organometallic cocatalyst and a cyclohexylmethyl dimethoxysilane external donor.

17. A polyolefin produced by the polymerization of an olefin in the presence of a procatalyst composition that is prepared by a process which comprises:

- (a) contacting $MgCl_2$, a lower alcohol $R_1OH$, wherein $R_1$ is a $C_1$–$C_4$ alkyl, and a titanium compound to form a first reaction product composition,

- (b) reacting said first reaction product composition with a first phthalic acid ester $Ph(COOR_2)_2$ wherein Ph is phenylene and $R_2$ is octyl, at a temperature in the range of 130° to 140° C. to form a solid transesterification product containing a second phthalic acid ester comprising the moiety $Ph(COOR_1)$ wherein Ph is phenylene and $R_1$ is $C_1$–$C_4$ alkyl, and

- (c) recovering said solid transesterification product as said procatalyst composition.

18. The polyolefin according to claim 17, wherein the average diameter of the polyolefin particles is about 1–2 mm, and particles having a diameter of less than about 1 mm are substantially absent.

19. The polyolefin of claim 17, wherein said solid transesterification product is reacted with the titanium compound at a temperature in the range of 130° to 140° C. to produce said procatalyst composition.

* * * * *